United States Patent
Zwicker et al.

(10) Patent No.: US 6,647,924 B1
(45) Date of Patent: Nov. 18, 2003

(54) EASILY DISASSEMBLABLE, COOLING-CAPABLE ANIMAL SHELTER

(76) Inventors: Kelley J. Zwicker, 1200 York Mills Road, Apt. 202, Toronto, Ontario (CA); Amber E. Zwicker, 1200 York Mills Road, Apt. 202, Toronto, Ontario (CA)

( * ) Notice: Subject to any disclaimer, the term of this patent is extended or adjusted under 35 U.S.C. 154(b) by 0 days.

(21) Appl. No.: 10/292,942

(22) Filed: Nov. 13, 2002

(51) Int. Cl.[7] .......................... A01K 1/03; A01K 31/06
(52) U.S. Cl. ...................... 119/452; 119/482
(58) Field of Search ................... 119/416, 452, 119/474, 482, 496, 497, 498, 712, 751

(56) References Cited

U.S. PATENT DOCUMENTS

| | | | | |
|---|---|---|---|---|
| 970,873 | A | * | 9/1910 | Bear .......................... 119/482 |
| 988,241 | A | * | 3/1911 | Bear .......................... 119/482 |
| 2,630,097 | A | * | 3/1953 | Johansen ..................... 119/498 |
| 3,156,213 | A | | 11/1964 | Patten |
| 3,428,026 | A | | 2/1969 | Sohmers et al. |
| 3,509,855 | A | * | 5/1970 | Priddy, Jr. ................... 119/497 |
| 4,006,713 | A | | 2/1977 | Hawley, III |
| 4,576,116 | A | | 3/1986 | Binkert |
| 4,691,664 | A | | 9/1987 | Crowell |
| 4,909,188 | A | | 3/1990 | Tominaga |
| 4,939,911 | A | | 7/1990 | Mandell |
| 5,044,325 | A | | 9/1991 | Miksitz |
| 5,134,972 | A | | 8/1992 | Compagnucci |
| 5,140,948 | A | | 8/1992 | Roberts |
| 5,148,767 | A | | 9/1992 | Torchio |
| 5,216,977 | A | | 6/1993 | Allen, Jr. |
| D338,985 | S | | 8/1993 | Altman et al. |
| D340,551 | S | | 10/1993 | Mitchell, Sr. |
| 5,603,288 | A | * | 2/1997 | Ferber ........................ 119/751 |

* cited by examiner

Primary Examiner—Charles T. Jordan
Assistant Examiner—Judith A. Nelson
(74) Attorney, Agent, or Firm—Donald R. Schoonover

(57) ABSTRACT

An animal shelter includes a base unit that has a peripheral support element that contains cooling gel releasably attached thereto. A frame unit includes a plurality of ribs each of which contains cooling gel. The ribs are releasably attached to the peripheral support element. A tent-like cover is releasably attached to the peripheral support element.

8 Claims, 2 Drawing Sheets

EASILY DISASSEMBLABLE, COOLING-CAPABLE ANIMAL SHELTER

BACKGROUND OF THE INVENTION

1. Field of the Invention

The present invention relates to the general art of animal husbandry, and to the particular field of pet shelters.

2. Discussion of the Related Art

Many animals, especially pets, suffer during warm weather. These animals generally have a fur coat which exasperates the effects of warm or hot weather. Often such animals try to keep cool by lying in the shade or the like. However, even such measures may not be sufficient if the weather is hot enough or if shade or the like is not available.

Therefore, there is a need for a pet shelter that can also cool an animal.

The art contains disclosures of pet shelters that include mechanical or electrical cooling conditioners. However, these shelters are expensive and difficult to use. These shelters may also be difficult and complicated to set up and/or to knock down. Thus, they are not easily and readily usable and suffer commercially.

While the art also contains disclosures of kennels that can be cooled by ice, these kennels do not adequately cool the entire animal and thus are not as effective as they can be. Furthermore, these kennels are not easy to reconfigure either to accommodate different animals or to easily replenish the cooling elements thereof.

Therefore, there is a need for a cooled pet shelter that can effectively cool the entire animal to maximize the animal's comfort. Still further, there is a need for a cooled pet shelter that can be easily reconfigured to accommodate different animals.

PRINCIPAL OBJECTS OF THE INVENTION

It is a main object of the present invention to provide a cooled pet shelter.

It is another object of the present invention to provide a cooled pet shelter that can be easily stored.

It is another object of the present invention to provide a cooled pet shelter that can be easily set up and knocked down.

It is another object of the present invention to provide a cooled pet shelter that can be easily reused.

It is another object of the present invention to provide a cooled pet shelter that can be easily used.

It is another object of the present invention to provide a cooled pet shelter that can effectively cool an animal.

It is another object of the present invention to provide a cooled pet shelter that can effectively cool the entire animal.

It is another object of the present invention to provide a cooled pet shelter that can be easily reconfigured.

SUMMARY OF THE INVENTION

These, and other, objects are achieved by an animal shelter which comprises a base unit which rests on a substrate, such as the ground, when in use and which includes a peripheral support element; the peripheral support element is releasably attached, such as by hook-and-loop fasteners, to the base unit. A frame unit is releasably attached to the base unit when in use and which includes a plurality of ribs each of which is releasably attached to the peripheral support element of the base unit when in use. A cooling gel is contained in each rib; a cooling gel is also contained in the peripheral support element of the base unit; and a flexible cover is releasably attached to the peripheral support unit when in use.

The shelter is easily knocked down for storage and then is easily and quickly set up for use. The support ribs and the peripheral support element are easily stored in a freezer section of a refrigerator and are then removed and assembled to the base unit. The cover is then placed on the set up frame and the pet can then easily enter and leave the shelter. The cooling gel will maintain a cool environment inside the shelter and the base unit can include a pet bed like material for furthering the comfort of the animal.

The entire environment of the shelter is thus cooled rather than only a small portion of the shelter, and the cooling characteristics of the shelter can be easily replenished. In fact, a user can have more than one frame so as soon as the cooling gel in the frame warms up to ambient temperature, that frame unit can be replaced with another frame unit that is cool. Since cooling elements are in both the base and the frame, the entire animal will be cooled.

The releasable nature of the connections between the frame and the base unit and the frame unit makes it easy to attach different frame units to the base unit, or vice versa whereby the shelter can be easily reconfigured to accommodate different animals.

BRIEF DESCRIPTION OF THE DRAWING FIGURES

DETAILED DESCRIPTION OF THE PREFERRED EMBODIMENT

Figure 1:
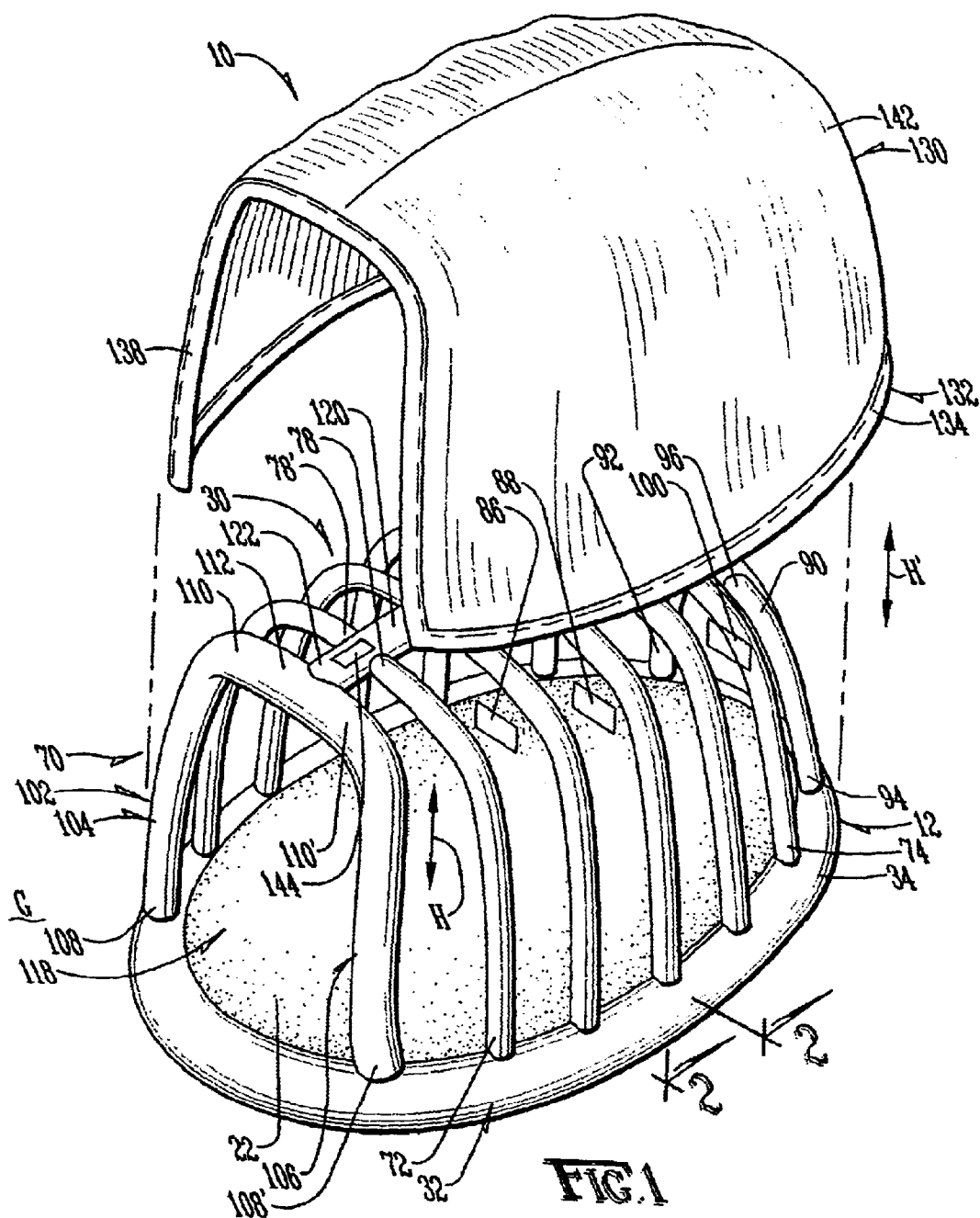
FIG. 1 is an exploded perspective view of an easily disassemblable, cooling-capable animal shelter embodying the present invention.
Figure 2:
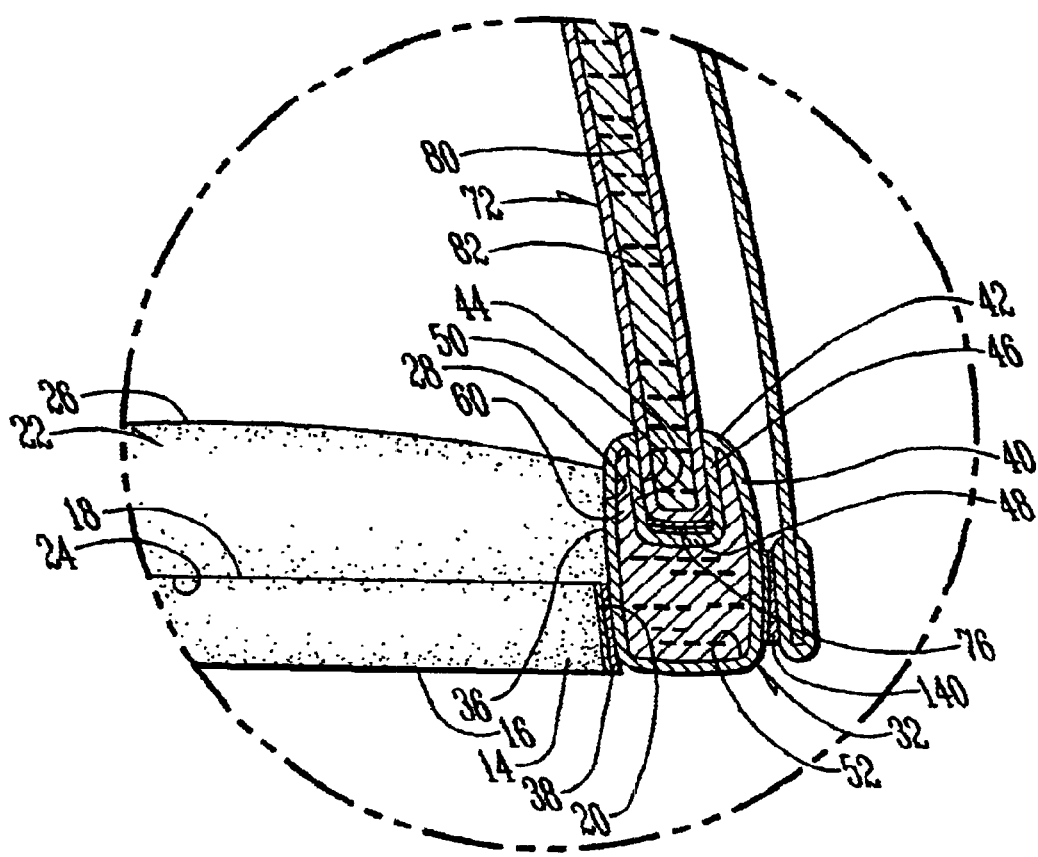
FIG. 2 is a detailed view taken along line 2—2 of FIG. 1.

Other objects, features and advantages of the invention will become apparent from a consideration of the following detailed description and the accompanying drawings.

As can be understood from the following descriptions and the Figures, the present invention is embodied in an animal shelter 10 which is easily set up, knocked down and reconfigured and will efficiently cool the animal. Animal shelter 10 comprises a base unit 12 which rests on a substrate, such as ground G, when in use. The base unit includes a first layer 14 having a first surface 16 which contacts the substrate in the use condition, and a second surface 18. The base unit 12 further includes an outer periphery 20 which extends away from the substrate in the use condition. A second layer 22 has a first surface 24 which contacts the second surface 18 of the first layer 14 of the base unit 12 in the use condition, a second surface 26 and an outer periphery 28 which extends away from the substrate in the use condition. The outer periphery 20 of the first layer 14 and the outer periphery 28 of the second layer 22 are congruent with each other in the use condition with the outer periphery 28 of the second layer 22 being a continuation of the outer periphery 20 of the first layer 14.

Shelter 10 further includes a frame unit 30 which includes a circumferential support element 32. Support element 32 has a base 34 which rests on the ground in the use condition. A first side wall 36 is releasably attached, such as by hook-and-loop fastener elements 38, to the outer peripheries 20, 28 of the first layer 14 and the second layer 22 and extends from the base 34 of the circumferential support element 32 of the frame unit 30. A second side wall 40 is spaced apart from the first side wall 36 of the circumferential support element 32 of the frame unit 30.

A U-shaped top wall 42 is spaced apart from the base 34 of the circumferential support element 32 and is connected to the first side wall 36 of the circumferential support element 32 and to the second side wall 40 of the circumferential support element 32. The U-shaped top wall 42 includes a first wall 44 spaced apart from the first side wall 36 of the circumferential support element 32, a second wall 46 spaced apart from the second side wall 40 of the circumferential support element 32 and a bight section 48 connecting the first wall 44 of the U-shaped top wall 42 to the second wall 46 of the U-shaped top wall 42. The U-shaped top wall 42 is spaced apart from the base 34 of the circumferential support element 32.

A channel 50 is defined in the U-shaped top wall 42 by the first wall 44 of the U-shaped top wall 42, the second wall 46 of the U-shaped top wall 42 and the bight section 48 of the U-shaped top wall 42.

An internal space 52 is defined between the base 34 of the circumferential support element 32, the first and second side walls 36, 40 of the circumferential support element 32 and the U-shaped top wall 42 of the circumferential support element 32.

A cooling gel material 60 is contained in the internal space 52 of the circumferential support element 32. Material 60 is of the type used to cool beverages and is a gel at room temperature and is solid when frozen and will remain cold for great lengths of time.

A support skeleton unit 70 includes a plurality of L-shaped support ribs, such as rib 72. Each support rib 72 includes a proximal end 74 frictionally and releasably mounted in the channel 50 defined in the U-shaped top wall 42 in the set up condition. The releasable connection between the rib 72 and the base 34 is made by hook-and-loop fastener elements 76, or can be via frictional engagement, or the like. A distal end 78 of each rib 72 is spaced apart from the second surface 26 of the second layer 22 of the base unit 12. A hollow bore 80 is defined between the proximal end 74 of each support rib 72 and the distal end 78 of each support rib 72. The hollow bore 80 of each support rib 72 is closed by the proximal end 74 of each support rib 72 and the distal end 78 of each support rib 72, and a cooling gel material 82 is contained in the hollow bore 80 of each support rib 72. Gel material 82 is similar to gel material 60.

The support ribs 72 of the support skeleton unit 70 are spaced apart from each other in a circumferential direction in the channel 50 defined in the U-shaped top wall 42 and are arranged in pairs with the distal ends 78 of one rib 72 of each pair of support ribs 72 located adjacent to each other, such as indicated at 78 and 78' in FIG. 1. The ribs 72 in each pair of support ribs 72 are arranged to be coplanar with each other. The planes containing each pair of support ribs 72 are spaced apart from each other, such as indicated by planes 86 and 88. The distal ends 78 of each of the support ribs 72 are located at a first height distance H above the second surface 26 of the second layer 22 of the base unit 12.

The skeleton unit 70 further includes a pair of rear support ribs 90 and 92. Each rear support rib 90, 92 has a proximal end 94 frictionally and releasably mounted in the channel 50 defined in the U-shaped top wall 42 in the set up condition and a distal end 96 spaced apart from the second surface 26 of the second layer 22 of the base unit 12. The distal ends 96 of the rear support ribs 90, 92 are located at a second height distance H' above the second surface 26 of the second layer 22 of the base unit 12. Second height distance H' is less than first height distance H.

The rear support ribs 90, 92 are co-planar with each other in plane 100. Plane 100 containing the rear support ribs 90, 92 is spaced apart from a plane containing an adjacent pair of support ribs.

A U-shaped entrance support rib 102 has two end legs 104 and 106. Each end leg 104, 106 in the set up condition has a proximal end 108 fictionally and releasably mounted in the channel 50 defined in the U-shaped top wall 42 at a location spaced apart from the proximal end 74 of an adjacent L-shaped support rib 72 in the circumferential direction of the channel 50 defined in the U-shaped top wall 42 and is spaced apart in the circumferential direction of the channel 50 defined in the U-shaped top wall 42 from proximal end 108' of the other end leg 106, 104 of the U-shaped entrance support rib 102. Each end leg 104, 106 further includes a distal end 110 which is spaced apart from the distal end 78 of an adjacent L-shaped support rib 72 in the circumferential direction of the channel 50 defined in the U-shaped top wall 42 and is also spaced apart from distal end 110' of the other end leg 106, 104 of the U-shaped entrance support rib 102 in the circumferential direction of the channel 50 defined in the U-shaped top wall 42. A bight leg portion 112 connects the distal ends 110, 110' of the two end legs 104, 106 of the U-shaped entrance support rib 102 to each other. The bight leg portions 112 of the U-shaped entrance support rib 102 are spaced apart from the second surface 26 of the second layer 22 of the base unit 12. A doorway 118 is defined by the U-shaped entrance support rib 102. The entrance rib 102 can also be hollow and can include cooling gel in the manner of the other support ribs 72.

A backbone 120 extends from the U-shaped entrance support rib to the pair of rear support ribs 90, 92 and has a first end 122 connected to the bight leg portions 112 of the U-shaped entrance support rib 102 and is also connected to the pair of rear support ribs 90, 92. The backbone 120 can be hollow and can contain cooling gel in the manner of the support ribs 72.

A flexible cover 130 is supported on the frame unit 30 and includes a peripheral edge 132 which has a first portion 134 releasably attached to the second side wall 40 of the circumferential support element 32 of the frame unit 30 in the set up condition and a second portion 138 which is releasably attached to the U-shaped entrance support rib 102 in the set up condition. Hook and loop fastening material, such as material 140, can be used to effect the releasable attachment of the cover 130 to the base 12. A body portion 142 is supported on the ribs 72, 90, 92 and can be releasably attached to the backbone 120 by hook and loop fastener material 144. The entrance support rib 102 and/or the backbone 120 can be formed of plastic or like material that is stiff enough to support the cover 130 if desired.

In use, all of the elements containing the cooling gel are stored in a freezer or the like. The base 12 is set up with the layers 14, 22 being placed in a convenient location and the support ribs 72, 90, 92 are all inserted into the channel 50 and held in place by the fastener elements. The cover 130 is then placed on top of the support ribs 72, 90, 92. When the cooling gel warms to room temperature, the cover 130 can be removed and a different peripheral support element and different support ribs used. The cover 130 is then replaced. Different sizes of shelters are easily defined by using different support ribs and the like as will occur to those skilled in the art based on the teaching of the present disclosure.

It is understood that while certain forms of the present invention have been illustrated and described herein, it is not to be limited to the specific forms or arrangements of parts described and shown.

What is claimed and desired to be covered by Letters Patent is:

1. An animal shelter comprising:
   a) base unit which rests on a ground, when in use, and which includes
      (1) a first layer having a first surface which contacts the substrate in the use condition, and a second surface, and an outer periphery which extends away from the substrate in the use condition, and
      (2) a second layer having a first surface which contacts the second surface of the first layer of said base unit in the use condition, a second surface and an outer periphery which extends away from the substrate in the use condition, the outer periphery of the first layer and the outer periphery of the second layer being congruent with each other in the use condition with the outer periphery of the second layer being a continuation of the outer periphery of the first layer;
   b) a frame unit which includes
      (1) a circumferential support element having
         (A) a base which rests on the ground in the use condition,
         (B) a first side wall which is releasably attached to the outer peripheries of the first layer and the second layer and which extends from the base of the circumferential support element of said frame unit,
         (C) a second side wall which is spaced apart from the first side wall of the circumferential support element of said frame unit,
         (D) a U-shaped top wall spaced apart from the base of the circumferential support element and which is connected to the first side wall of the circumferential support element and to the second side wall of the circumferential support element, the U-shaped top wall including a first wall spaced apart from the first side wall of the circumferential support element, a second wall spaced apart from the second side wall of the circumferential support element and a bight section connecting the first wall of the U-shaped top wall to the second wall of the U-shaped top wall and which is spaced apart from the base of the circumferential support element,
         (E) a channel defined in the U-shaped top wall by the first wall of the U-shaped top wall, the second wall of the U-shaped top wall and the bight section of the U-shaped top wall,
         (F) an internal space defined between the base of the circumferential support element, the first and second side walls of the circumferential support element and the U-shaped top wall of the circumferential support element, and
         (G) a cooling gel material contained in the internal space of the circumferential support element,
      (2) a support skeleton unit which includes
         (A) a plurality of L-shaped support ribs, each support rib including
            (i) a proximal end frictionally and releasably mounted in the channel defined in the U-shaped top wall in the set up condition,
            (ii) a distal end spaced apart from the second surface of the second layer of said base unit, and
            (iii) a hollow bore defined between the proximal end of each support rib and the distal end of each support rib, the hollow bore of each support rib being closed by the proximal end of each support rib and the distal end of each support rib, and
            (iv) a cooling gel material contained in the hollow bore of each support rib,
         (B) the support ribs of the support skeleton unit being spaced apart from each other in a circumferential direction in the channel defined in the U-shaped top wall,
         (C) the support ribs being arranged in pairs with the distal ends of one rib of each pair of support ribs being located adjacent to each other, the ribs in each pair of support ribs being arranged to be coplanar with each other,
         (D) the planes containing each pair of support ribs being spaced apart from each other,
         (E) the distal ends of each of the support ribs being located at a first height distance above the second surface of the second layer of said base unit,
         (F) a pair of rear support ribs, each rear support rib having
            (i) a proximal end frictionally and releasably mounted in the channel defined in the U-shaped top wall in the set up condition,
            (ii) a distal end spaced apart from the second surface of the second layer of said base unit, with the distal ends of the rear support ribs being located at a second height distance above the second surface of the second layer of said base unit, with the second height distance being less than the first height distance,
         (G) the rear support ribs being co-planar with each other, and the plane containing the rear support ribs being spaced apart from a plane containing an adjacent pair of support ribs,
         (H) a U-shaped entrance support rib having
            (i) two end legs, with each end leg in the set up condition having a proximal end fictionally and releasably mounted in the channel defined in the U-shaped top wall at a location spaced apart from the proximal end of an adjacent L-shaped support rib in the circumferential direction of the channel defined in the U-shaped top wall and spaced apart in the circumferential direction of the channel defined in the U-shaped top wall from the proximal end of the other end leg of the U-shaped entrance support rib, each end leg further including a distal end which is spaced apart from the distal end of an adjacent L-shaped support rib in the circumferential direction of the channel defined in the U-shaped top wall and which is spaced apart from the distal end of the other end leg of the U-shaped entrance support rib in the circumferential direction of the channel defined in the U-shaped top wall, and
            (ii) bight leg portions connecting the distal ends of the two end legs of the U-shaped entrance support rib to each other, the bight leg portions of the U-shaped entrance support rib being spaced apart from the second surface of the second layer of said base unit, and
            (iii) a backbone extending from the U-shaped entrance support rib to the pair of rear support ribs and having a first end connected to the bight leg of the U-shaped entrance support rib and is connected to the pair of rear support ribs; and c) a flexible cover supported on said frame unit and which includes
   (1) a peripheral edge which has a first portion releasably attached to the second side wall of the circumferential support element of said frame unit in the set up condition and a second portion which is releasably attached to the U-shaped entrance support rib in the set up condition, and
   (2) a body portion.

2. An animal shelter comprising:
a) a base unit which rests on a ground, when in use and which includes a peripheral support element releasably attached to said base unit;
b) a frame unit which is releasably attached to said base unit when in use and which includes
   (1) a plurality of ribs each of which is releasably attached to the peripheral support element of said base unit when in use,
   (2) a cooling gel contained in each rib;
c) a cooling gel contained in the peripheral support element of said base unit; and
d) a flexible cover releasably attached to the peripheral support unit when in use.

3. The animal shelter as described in claim 1 further including hook-and-loop fastener material releasably connecting the first side wall of the base of the circumferential support element to the outer peripheries of the first layer and the second layer in the set up condition.

4. The animal shelter as described in claim 3 further including hook-and-loop fastener material releasably connecting the first portion of the peripheral edge of said flexible cover to the second side wall of the circumferential support element of said frame unit in the set up condition.

5. The animal shelter as described in claim 3 further including hook-and-loop fastener material releasably connecting the second portion of the peripheral edge of said flexible cover to the U-shaped entrance support rib in the set up condition.

6. The animal shelter as described in claim 5 further including hook-and-loop fastener material releasably connecting the proximal end of each L-shaped support rib to the U-shaped top wall of the circumferential support element of said frame unit in the set up condition.

7. The animal shelter as described in claim 6 further including hook-and-loop fastener material releasably connecting the flexible cover to the backbone of the support skeleton unit.

8. The animal shelter as described in claim 7 wherein the backbone of said frame unit includes a hollow bore defined between the first end of the backbone and a second end of the backbone and further includes a cooling gel in the hollow bore of the backbone.

* * * * *